No. 796,317. PATENTED AUG. 1, 1905.
L. J. W. H. GIFFHORN, DEC'D.
E. GIFFHORN, ADMINISTRATRIX.
SLIDE VALVE FOR STEAM ENGINES.
APPLICATION FILED NOV. 25, 1903.

INVENTOR
L.J.W.H.GIFFHORN
DECEASED
EMILY GIFFHORN ADMINISTRATRIX
BY
ATTORNEYS

UNITED STATES PATENT OFFICE.

LUDWIG J. W. H. GIFFHORN, OF SPOTSWOOD, NEW JERSEY; EMILY GIFFHORN ADMINISTRATRIX OF SAID LUDWIG J. W. H. GIFFHORN, DECEASED.

SLIDE-VALVE FOR STEAM-ENGINES.

No. 796,317.　　　Specification of Letters Patent.　　　Patented Aug. 1, 1905.

Application filed November 25, 1903. Serial No. 182,636.

*To all whom it may concern:*

Be it known that I, LUDWIG JULIUS WILLIAM HENRY GIFFHORN, a citizen of the United States, residing in Spotswood, in the county of Middlesex and State of New Jersey, have invented a new and useful Slide-Valve for Steam-Engines, of which the following is a specification.

My invention relates to improvements in the slide-valve of steam-engines; and the objects of my improvements are to remove or counteract the well-known defects of the slide-valve as it now exists—namely, the unevenness of the valve and valve-seat resulting from wear—and thereby to prevent and remove the effects caused by the said unevenness, such as loss of steam, coal or other fuel, machinery, and money.

This improved slide-valve is self-regrinding. It will not get uneven during its work, but maintain a smooth surface throughout its existence. Any little unevenness occasionally arising is at once ground off by the valve's own different movements—*i. e.*, reciprocating and rotary—thus preventing any great loss of steam and loss of power of the engine.

Reference is to be had to the accompanying drawings, forming a part of this specification, in which similar characters of reference indicate corresponding parts in all the figures.

Figure 1:
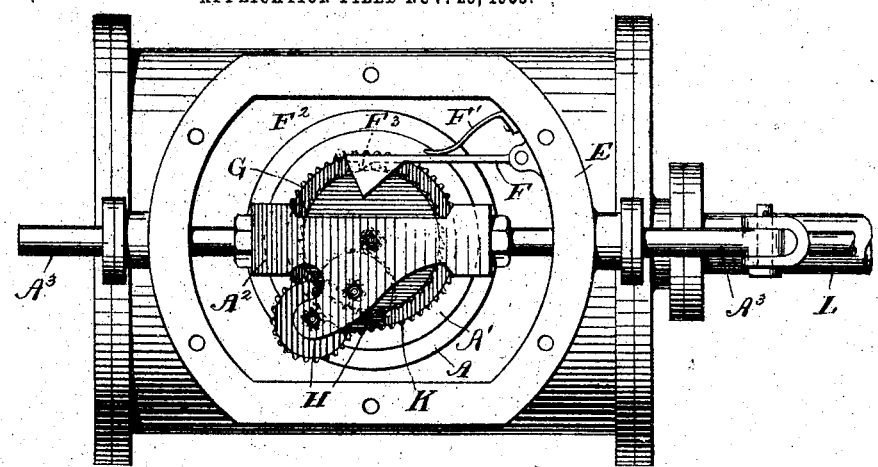
Figure 2:
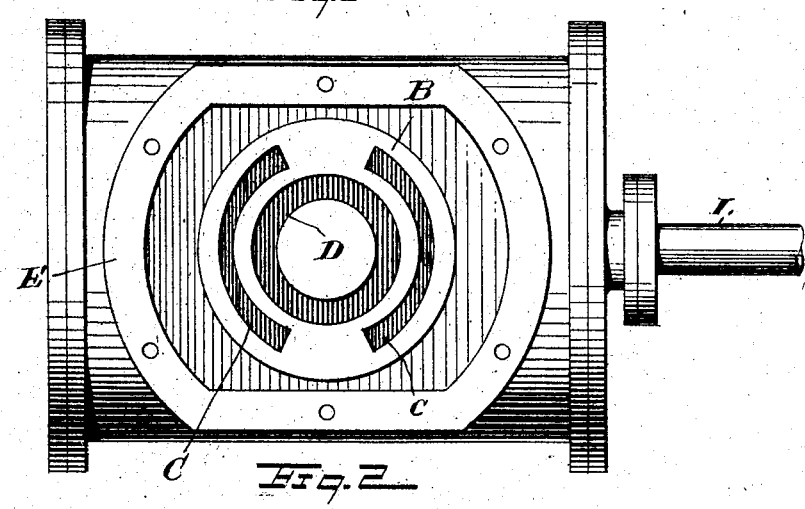
Figure 3:
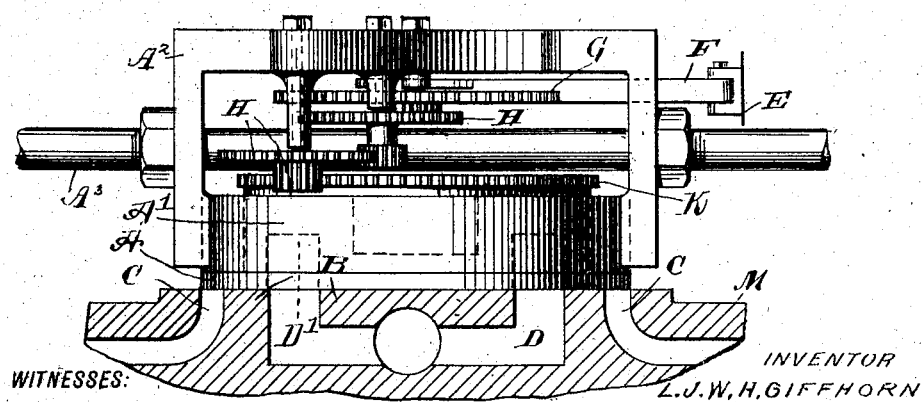

Figure 1 is a plan view of a cylinder, showing a preferred form of my invention applied thereto. Fig. 2 is a plan view of the cylinder with parts removed to show the steam and exhaust ports and the valve-chest; and Fig. 3 is a side elevation of the parts shown in Fig. 1, upon an enlarged scale, with the cylinder in section.

A represents a slide-valve working upon a seat B, which has steam-ports C C and an exhaust-port D. A valve-chest E, having rounded ends, as indicated in Figs. 1 and 2, is provided for the reception of the parts above mentioned. The valve A is circular in shape and rests securely in a frame A', upon which is mounted a cap $A^2$. A valve-rod $A^3$ passes through the cap and is secured to it. The valve A is reciprocated by the valve-rod in the ordinary manner on the valve-seat. The valve-seat has a rounded slightly-oval outline conforming substantially to the shape of the valve-chest. The steam-ports C C are also rounded in outline, and they are made long, as indicated in Fig. 2, so as to have a large area and allow a quick and easy steam cut-off. The exhaust D is circular in shape, as is also the groove D' in the valve A.

In addition to its reciprocating motion the valve is given a rotary movement through the medium of some suitable mechanism, which may be placed inside the valve-chest, as indicated in the figures, or outside, as may be desired. The rotary motion is preferably imparted very slowly, so as to require very little power. It is used for the purpose of preventing any certain part of the valve from passing twice in succession over the same part of the valve-seat and for grinding off any unevenness that may occur. The mechanism which I prefer to employ is placed inside the valve-chest and comprises a ratchet-bar F, pivoted to the wall of the chest and held in its normal position by means of a spring F'. The bar F has a flange $F^2$ upon its operating end, which serves to keep it in contact with a ratchet-wheel G. It also has a tooth or extension $F^3$, fitting the teeth of the wheel G and adapted to impart an intermittent motion of rotation thereto by the reciprocation of the valve. It will be obvious that as the bar F is stationary except for its pivotal motion the passage of the wheel G back and forth in engagement with the tooth $F^3$ will result in the rotation of the wheel G in the manner mentioned above.

Connected with the wheel G is a train of gears which may be of any convenient construction and is represented in its several parts by the letter H. The last of the train of gear-wheels meshes with a circular rack K, which is situated on the outer surface of the valve and is rigidly connected to it. The gearing H is all mounted upon the cap $A^2$, and it will be obvious that the rotation of the wheel G will cause the circular rack K and valve A to rotate at a very slow speed.

It will be obvious that the ordinary reciprocation of the valve is employed in the usual manner and that it causes the rotation of the valve. It will also be obvious that many modifications may be made in the embodiment of my invention illustrated without departing from the spirit thereof and that the invention is not strictly limited to the form shown.

Having thus described my invention, I claim as new and desire to secure by Letters Patent—

1. The combination with a valve-chest having rounded ends, arc-shaped admission-ports, and a circular exhaust-port, of a circular slide-valve, and means mounted on the chest and valve for causing the reciprocation of the valve to give to it a positive motion of rotation.

2. The combination with a valve-chest having arc-shaped admission-ports and a circular exhaust-port, of a reciprocating circular valve, and means for rotating the valve on its own axis, comprising a circumferential gear, a train of gears connected with said circumferential gear, a wheel in engagement with said train of gears and having a ratchet, and a pivoted bar having a tooth meshing with said ratchet and a flange for guiding the bar on the wheel.

3. The combination with a valve-chest having rounded ends, arc-shaped admission-ports, and a circular exhaust-port, of a reciprocatory circular valve, and means for rotating the valve on its own axis, comprising a circumferential gear on the valve, a train of gears meshing with said circumferential gear, a wheel having a toothed portion in engagement with said train of gears, a second toothed portion constituting a ratchet, a bar pivoted to a stationary part of the device and having a tooth adapted to engage with said ratchet, a spring bearing upon said bar for retaining the tooth in engagement with said ratchet, and a flange on said bar adapted to engage with the face of said wheel and guide the bar.

4. In a slide-valve for steam-engines, the combination of a circular valve, a circular frame in which said valve is rotatably mounted, a cap on the frame, a circumferential gear on the valve, a train of gears supported by said cap and connected with said circumferential gear, a wheel having a toothed portion in engagement with said train of gears and a second toothed portion parallel with the first toothed portion constituting a ratchet, a bar pivoted to a stationary part of the device and having a tooth adapted to engage with said ratchet, a spring bearing upon said bar for retaining the tooth in engagement with the ratchet, and a flange on said bar adapted to engage with the face of said wheel and guide the bar.

5. In a slide-valve for steam-engines, the combination of a circular valve, a circular frame in which the valve is rotatably mounted, a cap on said frame, a circumferential gear on the valve, a train of gears supported by said cap and connected with said circumferential gear, and means for putting said train of gears in motion when said frame is reciprocated.

In testimony whereof I have signed my name to this specification in the presence of two subscribing witnesses.

L. J. W. H. GIFFHORN.

Witnesses:
JAMES EMERSON,
JOHN EWING.